Oct. 3, 1944.  T. C. WOODMAN  2,359,347
TRANSLUCENT STRUCTURE
Filed Dec. 29, 1942

Inventor
T.C. WOODMAN
By
Attorneys

UNITED STATES PATENT OFFICE 2,359,347

TRANSLUCENT STRUCTURE

Thomas Clifford Woodman, London, England, assignor to British Celanese Limited, London, England, a company of Great Britain Application December 29, 1942, Serial No. 470,467
In Great Britain January 1, 1942

9 Claims. (Cl. 160—354)

This invention relates to translucent structures (including transparent structures) and particularly to window-lights of light-weight flexible translucent materials suitable for use in substitution for glass, especially in situations where glass would be likely to be damaged by explosive blast or other shock.

Materials that are suitable for the above purpose, being very flexible and light in weight, require reinforcement. For this purpose light metal rims or frames, e. g. of U-section or angle section, and cross-members of similar form, may be used. Such reinforcing means, however, are liable to be unduly rigid, so that, when the window-light is subjected to explosive blast or other shock, the reinforcements buckle, and damage the translucent sheet material, instead of the whole window-light being blown out of position in one undamaged piece. It is an object of the present invention to provide a window-light in which this disadvantage is overcome or substantially reduced.

According to the present invention a window-light comprises a translucent sheet of flexible material reinforced by linear elements secured to the sheet, said linear elements being also of flexible material. By "linear elements" is meant elements having one preponderating linear dimension that is greatly in excess of any dimension at right angles thereto. The reinforcing elements may comprise strips of flexible material, e. g. of the same material as that of which the sheet consists, and may with advantage extend from the surface of the sheet so as to resist bending of the sheet. The reinforcements thus provided in the window-light according to the present invention, while imparting sufficient rigidity to the window-light to enable it to withstand the ordinary conditions of use and handling, are sufficiently flexible to yield, together with the translucent sheet material, so that when the window-light is subjected to exceptional shock the window-light may be blown out of position as a whole without suffering any substantial damage in itself, and may still be capable of further use.

The reinforcements provided in the window-light according to the present invention may be disposed all around the edges of the translucent sheet, and/or may cross the middle of the sheet from edge to edge to provide reinforcement for the centre of the sheet. One form of reinforcement that is particularly suitable for the edges of the sheet is a length of rope or cord enclosed by turning over a strip of material at the edge of the sheet so as to form a hem around the entire periphery of the sheet, the whole being sealed by any convenient means. Another form of reinforcement, suitable either for the edges of the sheet or to form cross pieces across the middle of the sheet, is a strip of sheet material, e. g. of the same material as the sheet itself, bent or folded so as to form a T-section, the vertical limb of the T being of double material. The vertical arm of the T may be further reinforced by the inclusion of one or more narrow strips of similar sheet material between its folds. The single arms of the T are caused to adhere to the surface of the sheet so that the doubled portion extends at right angles to the sheet.

Any kind of flexible translucent sheet material suitable for use in substitution for window glass may be employed as a basis for the window-light according to the present invention; a material that has been found very convenient for the purpose is an open, net-like textile fabric whose meshes are closed by a film of cellulose acetate or other transparent film-forming substance or composition.

The attachment of the reinforcing members to the sheet is preferably brought about by the use of a suitable adhesive having a solvent or softening action on the substance of the translucent sheet and/or of the reinforcing members. Thus the reinforcing members may be moistened with a volatile solvent for the substance of the sheet and lightly pressed against the sheet until the solvent has evaporated so that adhesion is effected by the softening of the substance of the sheet. Where rope-like elements enclosed in a hem at the edges of the sheet are employed, the hem may be closed by turning the material back on itself and causing it to adhere by means of a solvent in the manner outlined above. Instead of a volatile solvent, a plasticiser or high-boiling solvent or softening agent for the substance of the sheet may be employed, preferably in conjunction with the use of heat and pressure to bring about adhesion. Again, an adhesive dope may be employed, containing in solution a suitable lacquer base, which may be the same as, or different from the substance of the sheet.

By way of example two forms of window-light in accordance with the present invention will now be described in greater detail with reference to the accompanying drawing in which.

The basis of the window-light in each case is a cotton fabric of net-like character having square meshes whose sides are about ¼" long, the fabric being doped by dipping it into a solution of cellulose acetate in acetone and then drying, so that the meshes of the fabric are closed by means of a thin film of cellulose acetate.

Figure 1:
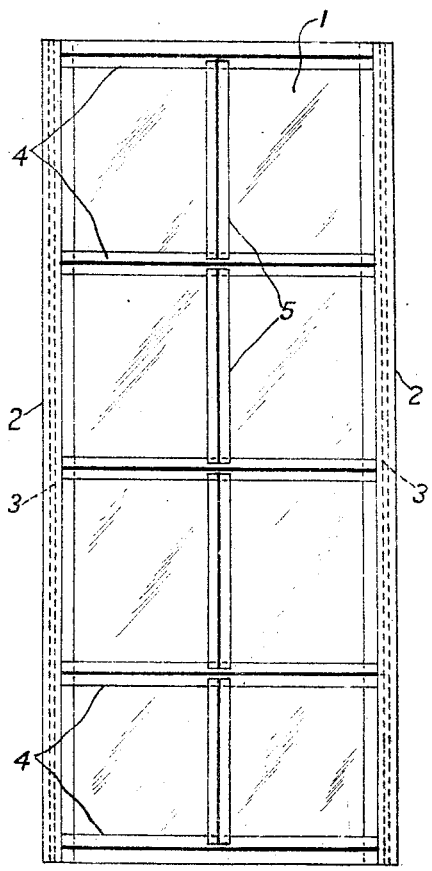
Figure 1 is a face view of one form of window-light.
Figure 3:
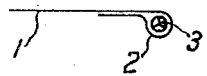
Figure 3 is a partial diagrammatic end view of a detail of Figure 1.
Figure 4:
Figure 4 is a partial diagrammatic end view of a detail occurring in both Figure 1 and Figure 2.

In Figure 1 a piece of this material 1, about 2 ft. in width and 4 ft. 6 in. in length, constitutes the body of the window-light. The lateral edges of this material are turned over to form hems 2 enclosing a length of rope or cord 3, the hems being secured by moistening the face of the material near its edge with acetone and pressing the moistened part down on the body of the piece 1. The form of the hem 2 and of the rope 3 enclosed therein are shown in Figure 3. The sheet 1 is further reinforced by means of cross-pieces 4 each formed from a strip about 6 in. wide of the same material as the sheet 1, the strip being folded as shown in Figure 4 to a T-section having a doubled limb 8 and arms of single thickness 9. One face of each of the arms 9 is moistened with acetone and pressed down on the face of the sheet 1. Between the cross-pieces 4 short sections 5 of similar form are attached running along the length of the sheet to form a central reinforcement.

Figure 2:
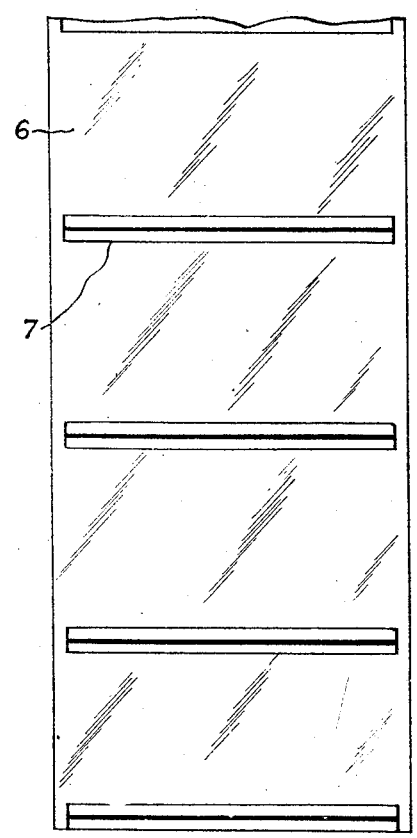
Figure 2 is a face view of the other form.

In Figure 2 a piece of fabric 6 about 2 ft. in width and of indefinite length, is reinforced by means of cross-pieces 7 similar in form to the cross-pieces 4 described with reference to Figure 1 and having a section similar to that shown in Figure 4.

Figure 5:
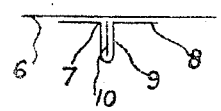
Figure 5 is a partial diagrammatic end view of an alternative arrangement to the detail shown in Figure 4.

If desired, the cross-pieces 4, 5 and 7 described with reference to Figure 1 may be strengthened in the manner shown in Figure 5 by including between the folds of the doubled part 8 of the cross-piece, an additional strip of material 10. More than one strip 10 may be employed so as to provide a multiple thickness of additional reinforcement. The strip or strips 10 are secured in position by moistening them with a solvent for the cellulose acetate before inserting them between the folds of the double part 8, and then pressing the folds of the part 8 inwards upon the strips 10.

Window-lights as described with reference to Figures 1 and 2 are particularly adapted for use as roof lights and may be positioned by being simply dropped into place, so that they rest on the glazing bars normally provided for the support of the roof lights, and secured by clamping or otherwise at the top edge. The form of window-light shown in Figure 1 may also be employed for use as a vertical window-light, being secured in position by any convenient means, e. g. by means of battens. The reinforcements 4, 5 and 7 should be disposed on the inner side of the sheet so that they are not exposed to the weather, whereby they might collect rain water. The window-lights, when in position, are sufficiently strong and rigid to withstand the stresses of ordinary use. When, however, such a window-light is subjected to exceptional pressure or blast the reinforcements are sufficiently flexible to yield with the translucent sheet 1 or 6 so that the reinforcements are not torn from the sheet, nor permanently buckled so as to damage the sheet. The whole window-light may be blown from its position as a single undamaged unit and placed again in position for further use.

Having described my invention, what I desire to secure by Letters Patent is:

1. A window-light comprising a translucent sheet of flexible material reinforced by strips of flexible sheet material having longitudinal folds dividing the strips into sections of which at least one adheres to the face of the sheet and at least one extends out of the plane of the sheet so as to resist bending of the sheet.

2. A window-light comprising a translucent sheet of flexible material reinforced by strips of flexible sheet material having longitudinal folds dividing the strips into sections of which at least one adheres to the face of the sheet and at least one extends out of the plane of the sheet so as to resist bending of the sheet, said translucent sheet having additional reinforcement in the form of a hem formed at the edge of the sheet by folding over the flexible material of which the sheet consists and a cord enclosed in said hem.

3. A window-light comprising a translucent sheet of flexible material reinforced by strips of flexible sheet material folded with longitudinal folds into a T-section having a double central limb and single lateral limbs, the lateral limbs adhering to the face of the sheet and the central limb extending out of the plane of the sheet so as to resist bending of the sheet.

4. A window-light comprising a translucent sheet of flexible material reinforced by strips of flexible sheet material folded with longitudinal folds into a T-section having a double central limb and single lateral limbs, the lateral limbs adhering to the face of the sheet and the central limb extending out of the plane of the sheet so as to resist bending of the sheet, additional narrow strips of flexible material being enclosed in the fold of the double limb so as to constitute additional reinforcement.

5. A window-light comprising a translucent sheet of net-like textile fabric whose meshes are closed by means of a film of transparent film-forming composition, said translucent sheet being reinforced by strips of flexible sheet material having longitudinal folds dividing the strips into sections of which at least one adheres to the face of the sheet and at least one extends out of the plane of the sheet so as to resist bending of the sheet.

6. A window-light comprising a translucent sheet of net-like textile fabric whose meshes are closed by means of a film of an organic derivative of cellulose, said translucent sheet being reinforced by strips of flexible sheet material having longitudinal folds dividing the strips into sections of which at least one adheres to the face of the sheet and at least one extends out of the plane of the sheet so as to resist bending of the sheet.

7. A window-light comprising a translucent sheet of net-like textile fabric whose meshes are closed by means of a film of transparent film-forming composition, said translucent sheet being reinforced by strips of flexible sheet material folded with longitudinal folds into a T-section having a double central limp and single lateral limbs, the lateral limbs adhering to the face of the sheet and the central limb extending out of the plane of the sheet so as to resist bending of the sheet.

8. A window-light comprising a translucent sheet of net-like textile fabric whose meshes are closed by means of a film of cellulose acetate, said translucent sheet being reinforced by strips of flexible sheet material folded with longitudinal folds into a T-section having a double central limb and single lateral limbs, the lateral limbs adhering to the face of the sheet and the central limb extending out of the plane of the sheet so as to resist bending of the sheet.

9. A window-light comprising a translucent sheet of net-like textile fabric whose meshes are closed by means of a film of cellulose acetate, said translucent sheet being reinforced by strips of flexible sheet material folded by longitudinal folds into a T-section having a double central limb and single lateral limbs, said lateral limbs adhering to the face of the sheet and said central limb extending out of the plane of the sheet so as to resist bending of the sheet, said strips being stiffened by the provision of narrow strips of flexible sheet material enclosed in the fold of the double limb and said translucent sheet having additional reinforcement in the form of a hem formed at the edge of the sheet by folding over the flexible material of which the sheet consists and a cord enclosed in said hem.

THOMAS CLIFFORD WOODMAN.